(12) United States Patent
Ishikawa et al.

(10) Patent No.: US 11,468,258 B2
(45) Date of Patent: Oct. 11, 2022

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventors: Rei Ishikawa, Saitama (JP); Kazuhiro Matsubayashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/071,890

(22) Filed: Oct. 15, 2020

(65) Prior Publication Data

US 2021/0124965 A1 Apr. 29, 2021

(30) Foreign Application Priority Data

Oct. 25, 2019 (JP) .............................. JP2019-194811

(51) Int. Cl.
*G06K 9/20* (2006.01)
*G06T 19/00* (2011.01)
*G06K 9/00* (2022.01)

(52) U.S. Cl.
CPC ....... *G06K 9/2081* (2013.01); *G06K 9/00671* (2013.01); *G06T 19/006* (2013.01); *G06K 2209/21* (2013.01)

(58) Field of Classification Search
CPC .......... G06T 19/006; H04N 2013/0085; G06K 9/00758; G06K 9/00671
USPC ......................................................... 345/419
See application file for complete search history.

(56) References Cited

U.S. PATENT DOCUMENTS

| 2017/0076428 A1* | 3/2017 | Ishikawa ............ G06K 9/00671 |
| 2020/0151427 A1* | 5/2020 | Kimura ...................... G06T 1/00 |
| 2020/0265633 A1* | 8/2020 | Okutani .................. G06F 3/011 |
| 2020/0404217 A1* | 12/2020 | Yerli ................... G06F 16/2379 |

FOREIGN PATENT DOCUMENTS

JP 6482498 B2 3/2019

* cited by examiner

*Primary Examiner* — Thomas J Lett
(74) *Attorney, Agent, or Firm* — Canon U.S.A., Inc. IP Division

(57) ABSTRACT

An information processing apparatus acquires viewpoint information indicating a position and a direction of a virtual viewpoint designated for generating a virtual viewpoint image in which a predetermined object is set as an object to be targeted, and object information indicating a position of an object. The information processing apparatus further identifies an object to be targeted that corresponds to the viewpoint information, based on the acquired viewpoint information and the acquired object information, and outputs information regarding the identified object.

21 Claims, 10 Drawing Sheets

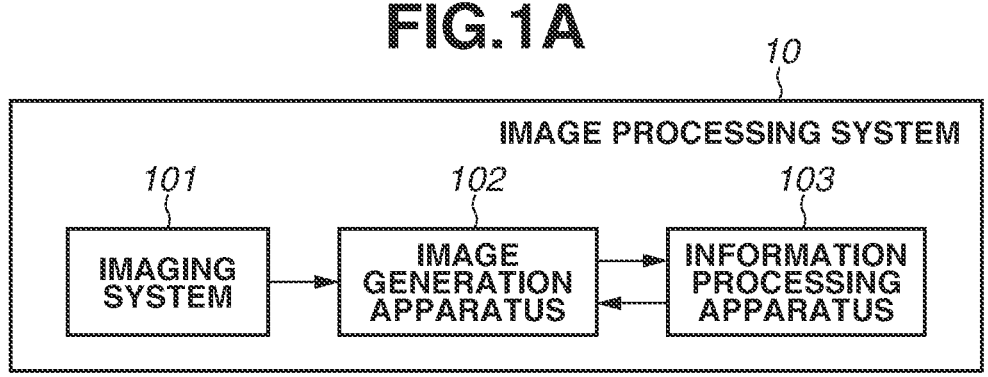
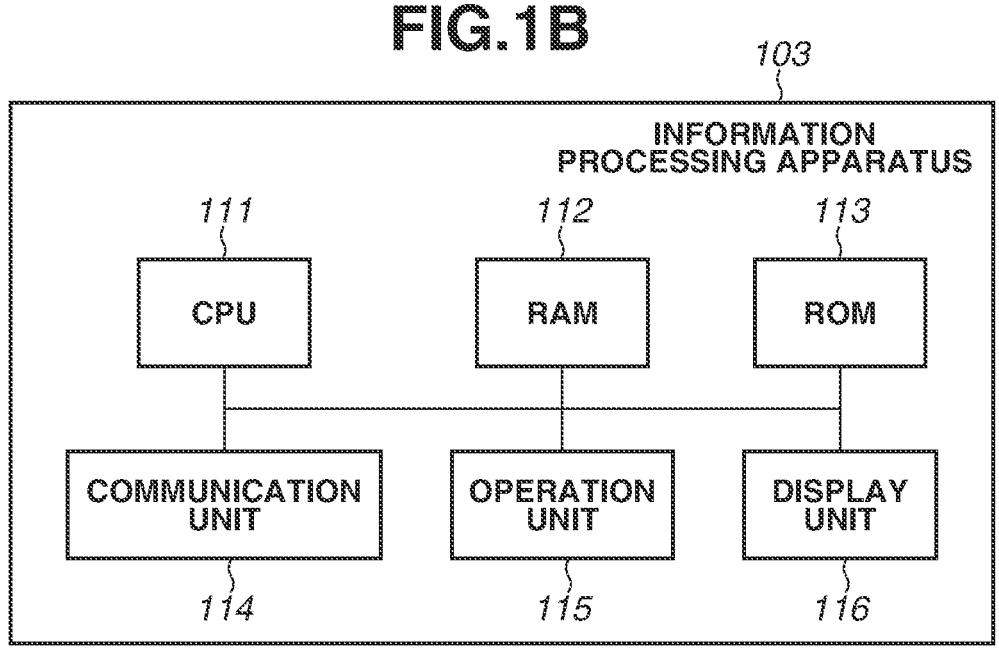

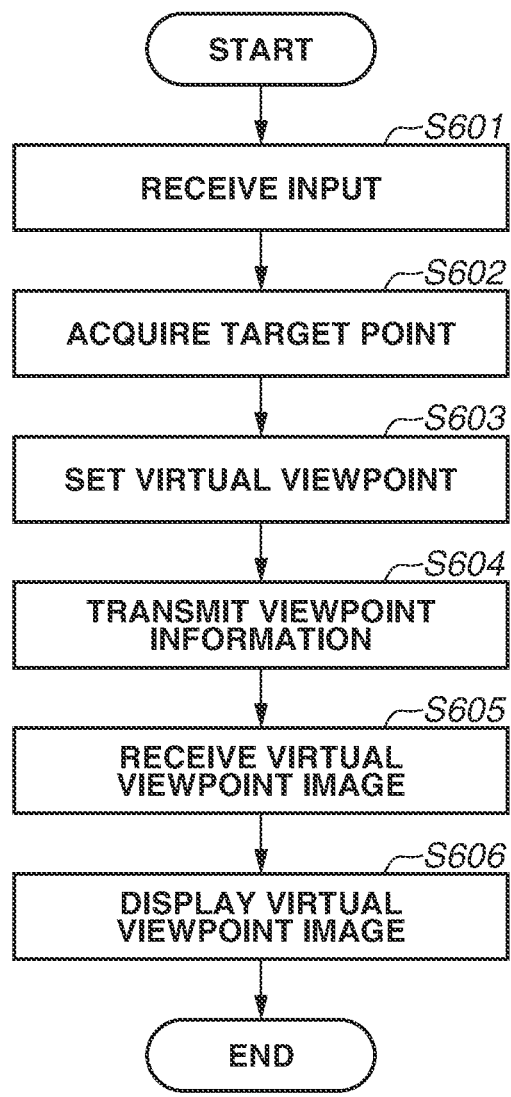

INFORMATION PROCESSING APPARATUS, INFORMATION PROCESSING METHOD, AND STORAGE MEDIUM

BACKGROUND

Field of the Disclosure

The present disclosure relates to a virtual viewpoint image generated in accordance with the designation of a virtual viewpoint.

Description of the Related Art

There is a technique for generating a virtual viewpoint image of which a viewpoint can be arbitrarily changed by using a plurality of images obtained by performing multi-viewpoint synchronized image capturing by a plurality of imaging apparatuses (cameras) installed at different positions. For example, by generating a virtual viewpoint image corresponding to a viewpoint set by a user based on a plurality of images captured at a sports event such as soccer or basketball, the user can watch the sports event from various viewpoints. Such a virtual viewpoint image can provide a viewer with new viewing experience.

By designating the position and the direction of a virtual viewpoint in accordance with the movement of an object, such as a player or a ball, at a target sports event, a creator creates a virtual viewpoint image in such a manner that a target scene can be presented as an impactful image. Japanese Patent No. 6482498 discusses a technique for designating a virtual viewpoint related to generation of a virtual viewpoint image, by operating an operation device or a user interface (UI) screen.

At the same time, it is demanded to enhance the convenience in use of viewpoint information related to generation of a virtual viewpoint image. For example, in a sports event that is an image-capturing target, a plurality of different virtual viewpoints is designated, and a plurality of pieces of viewpoint information indicating the virtual viewpoints is stored into a database. When a user desires to find viewpoint information based on which a virtual viewpoint image including a specific player can be generated, the user displays and checks, one by one, virtual viewpoint images corresponding to the respective pieces of stored viewpoint information, which can as a result take the user's time and labor. For example, when the user views a virtual viewpoint image corresponding to certain viewpoint information and including a specific player, and then, the user desires to view another virtual viewpoint image including the specific player viewed from a different viewpoint, it is difficult for an inexperienced user to newly designate a virtual viewpoint without any hint.

SUMMARY

According to an aspect of the present disclosure, an information processing apparatus includes a first acquisition unit configured to acquire viewpoint information indicating a position and a direction of a virtual viewpoint designated for generating a virtual viewpoint image in which a predetermined object is set as an object to be targeted, a second acquisition unit configured to acquire object information indicating a position of an object, an identification unit configured to identify an object to be targeted that corresponds to the viewpoint information based on the viewpoint information acquired by the first acquisition unit and the object information acquired by the second acquisition unit, and an output unit configured to output information regarding the object identified by the identification unit.

Further features of the present disclosure will become apparent from the following description of exemplary embodiments with reference to the attached drawings.

BRIEF DESCRIPTION OF THE DRAWINGS

FIGS. 1A and B are diagrams illustrating a configuration example of an image processing system.

FIG. 6 is a flowchart illustrating an example of an operation of the information processing apparatus relating to setting of a virtual viewpoint that uses a target point.

DESCRIPTION OF THE EMBODIMENTS

[System Configuration]

Figure 2A:
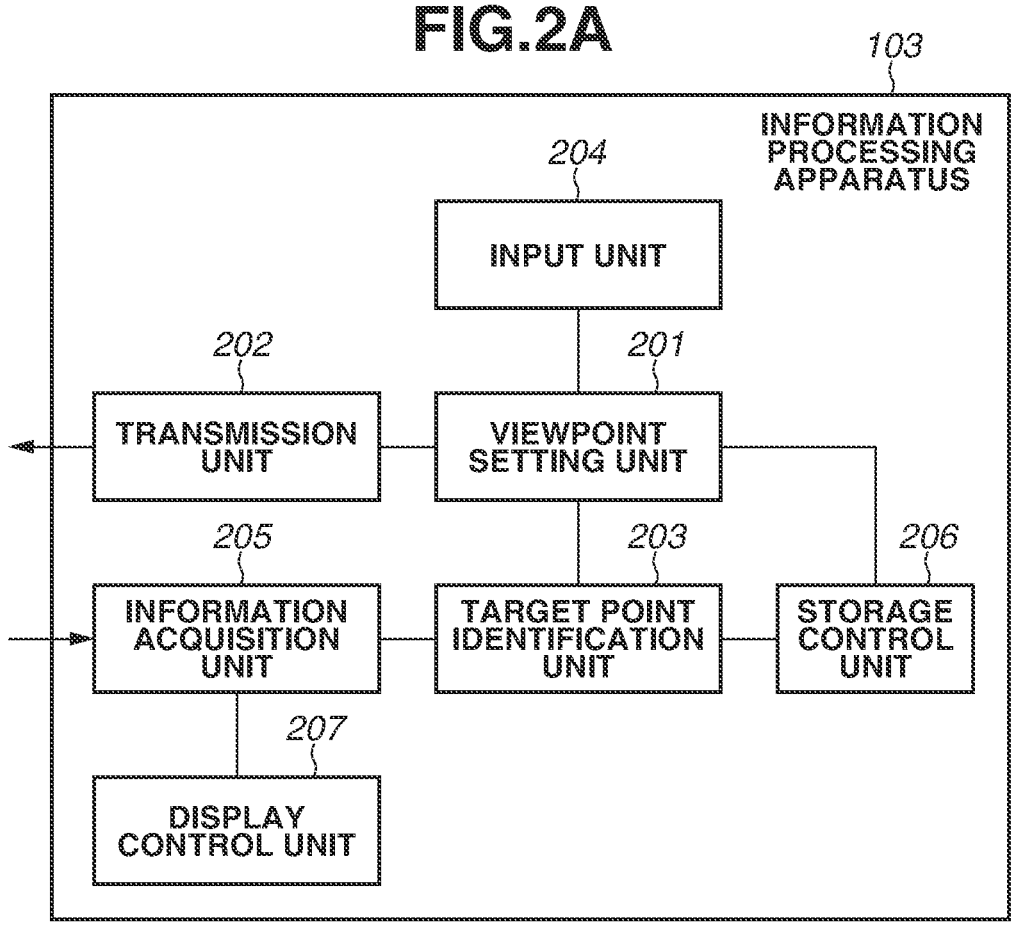
FIGS. 2A and 2B are diagrams illustrating a configuration example of an information processing apparatus.

Hereinafter, a first exemplary embodiment will be described. FIG. 1A is a diagram illustrating a configuration example of an image processing system 10. The image processing system 10 is a system that generates a virtual viewpoint image representing a view from a designated virtual viewpoint, based on a plurality of images (a plurality of viewpoint images) that is based on image capturing performed by a plurality of imaging apparatuses, and the designated virtual viewpoint. A virtual viewpoint image in the present exemplary embodiment can also be referred to as a free viewpoint video, but the virtual viewpoint image is not limited to an image corresponding to a viewpoint freely (arbitrarily) designated by the user. For example, an image corresponding to a viewpoint selected by the user from among a plurality of candidates is also included in the virtual viewpoint image. In the present exemplary embodiment, the description will be mainly given of a case where designation of a virtual viewpoint is performed by a user operation, but the designation of a virtual viewpoint may be automatically performed based on a result of image analysis. In addition, in the present exemplary embodiment, the description will be mainly given of a case where a virtual viewpoint image is a moving image, but a virtual viewpoint image may be a still image. In other words, the image processing system 10 can process both of a still image and a moving image. In the following description, unless otherwise stated, the term "image" will be described as including both concepts of a moving image and a still image.

The image processing system 10 includes an imaging system 101, an image generation apparatus 102, and an information processing apparatus 103. The imaging system 101 includes a plurality of imaging apparatuses that captures images of a subject (object) existing within an image capturing region, from a plurality of directions. Examples of the image capturing region include a sports stadium or arena where a sports event, such as a soccer game or a karate match, is held, and a stage where a concert or theatrical performance is taken place. The plurality of imaging apparatuses is installed at respectively different positions to surround the image capturing region, and synchronously performs image capturing. The plurality of imaging apparatuses needs not be installed over the entire periphery of the image capturing region, and may be installed only at a part of the periphery of the image capturing region depending on the restriction of an installation location. The number of imaging apparatuses is not limited. For example, when an image capturing region is a soccer pitch, about 30 imaging apparatuses are installed around the pitch. In addition, imaging apparatuses having different functions such as a telecamera and a wide angle camera may be installed. The imaging system 101 outputs a plurality of viewpoint images that is based on image capturing performed by the plurality of imaging apparatuses, to the image generation apparatus 102.

The image generation apparatus 102 generates a virtual viewpoint image based on the plurality of viewpoint images acquired from the imaging system 101 and viewpoint information acquired from the information processing apparatus 103. The virtual viewpoint image is generated using the following method, for example. First of all, from a plurality of viewpoint images obtained by the plurality of imaging apparatuses performing image capturing from the respectively different directions, a foreground image obtained by extracting a foreground region corresponding to a predetermined object such as a human or a ball, and a background image obtained by extracting a background region other than the foreground region are acquired. In addition, a foreground model representing a three-dimensional shape of the predetermined object and texture data for coloring the foreground model are generated based on the foreground image. Texture data for coloring a background model representing a three-dimensional shape of a background such as a stadium is generated based on the background image. Then, a virtual viewpoint image is generated by mapping the texture data with respect to the foreground model and the background model, and performing rendering in accordance with a virtual viewpoint indicated by viewpoint information. The method for generating a virtual viewpoint image is not limited to this. Various methods, for example a method for generating a virtual viewpoint image by performing projection transform on a captured image without using a three-dimensional model, can be used.

The viewpoint information used in the generation of a virtual viewpoint image is information indicating the position and the direction (eye direction) of a virtual viewpoint. Specifically, the viewpoint information includes a parameter set including parameters indicating positions of a virtual viewpoint in a three-dimensional space (positions on an X-axis, a Y-axis, and a Z-axis), and parameters indicating the directions of the virtual viewpoint in pan, tilt, and roll directions. In addition, the viewpoint information includes a plurality of parameter sets respectively corresponding to a plurality of time points. For example, the viewpoint information includes a plurality of parameter sets corresponding to a plurality of respective frames included in a moving image of a virtual viewpoint image and indicates the positions and directions of a virtual viewpoint at each of the plurality of consecutive time points. In addition, parameters included in the viewpoint information are not limited to the above-described parameters. For example, a parameter set serving as viewpoint information may include a parameter indicating a size of a field of view (viewing angle) corresponding to a virtual viewpoint, such as a zoom ratio or a focal length, or a parameter indicating a time.

In the description of the present exemplary embodiment, a term "virtual camera" is used. The virtual camera is an imaginary camera different from a plurality of imaging apparatuses actually installed around an image capturing region, and is a concept for conveniently describing a virtual viewpoint related to the generation of a virtual viewpoint image. In other words, a virtual viewpoint image can be regarded as an image captured from a virtual viewpoint set in a three-dimensional virtual space associated with an image capturing region. Then, the position and the direction of a viewpoint in the imaginary image capturing can be represented as the position and the direction of a virtual camera. In other words, assuming that a camera is present at the position of the virtual viewpoint set in the space, a virtual viewpoint image can be regarded as an image simulating a captured image obtained by the camera. In the present exemplary embodiment, a temporal transition of a virtual viewpoint will be described as a virtual camera path. Nevertheless, the use of the concept of a virtual camera is not essential to implement the configuration of the present exemplary embodiment. In other words, it is only required that at least information indicating a specific position in space and information indicating a direction are set, and a virtual viewpoint image is generated in accordance with the set information.

The image generation apparatus 102 can generate a live virtual viewpoint image by sequentially generating virtual viewpoint images based on a plurality of viewpoint images acquired from the imaging system 101. In addition, a live virtual viewpoint image generated by the image processing system 10 is an image representing the state of an image capturing region at a time point earlier than the current time by a predetermined time, due to the influence of processing delay in the imaging system 101 and the image generation apparatus 102. The image generation apparatus 102 can also generate a virtual viewpoint image representing the state of an image capturing region at an arbitrary time point in the past (replay virtual viewpoint image), by storing, into a storage unit, a plurality of viewpoint images acquired from the imaging system 101.

The virtual viewpoint image generated by the image generation apparatus 102 is output to the information processing apparatus 103 and is displayed on a display unit 116 included in the information processing apparatus 103. Nevertheless, an output destination of the virtual viewpoint image is not limited to this. For example, the generated virtual viewpoint image may be output to a display device (not illustrated) different from the information processing apparatus 103, or the generated virtual viewpoint image may also be output to a storage unit included in the image generation apparatus 102 or an external storage device (not illustrated). The image generation apparatus 102 may output a live virtual viewpoint image and a replay virtual viewpoint image to different output destinations. In addition, the image processing system 10 may include a plurality of information processing apparatuses 103, and each of the information processing apparatuses 103 may connect with and communicate with the image generation apparatus 102.

[Hardware Configuration]

FIG. 1B illustrates a hardware configuration example of the information processing apparatus 103. A hardware configuration of the image generation apparatus 102 is similar to the configuration of the information processing apparatus 103, which will be described below. The information processing apparatus 103 includes a central processing unit (CPU) 111, a random access memory (RAM) 112, a read-only memory (ROM) 113, a communication unit 114, an operation unit 115, and the display unit 116.

The CPU 111 controls the entire information processing apparatus 103 using a computer program or data stored in the RAM 112 or the ROM 113. In addition, the information processing apparatus 103 may include a piece of dedicated hardware or a plurality of pieces of dedicated hardware that is different from the CPU 111, and at least part of processing to be performed by the CPU 111 may be executed by the dedicated hardware. Examples of the dedicated hardware include an application specific integrated circuit (ASIC), a field programmable gate array (FPGA), and a digital signal processor (DSP). The RAM 112 temporarily stores a computer program read out from the ROM 113, interim results of calculation, and data supplied from the outside via the communication unit 114. The ROM 113 holds computer programs and data that do not require changes.

The communication unit 114 includes a communication interface for performing communication that uses Ethernet or a universal serial bus (USB), and communicates with an external device such as the image generation apparatus 102. The operation unit 115 includes, for example, a keyboard, a mouse, a joystick, or a touch panel, receives operations performed by the user, and inputs various instructions to the CPU 111. The display unit 116 includes, for example, a liquid crystal display or a light-emitting diode (LED) and displays a graphical user interface (GUI) for the user operating the information processing apparatus 103. In the present exemplary embodiment, the operation unit 115 and the display unit 116 are assumed to exist inside the information processing apparatus 103, but at least either one of the operation unit 115 and the display unit 116 may exist on the outside of the information processing apparatus 103 as another apparatus.

Figure 2B:
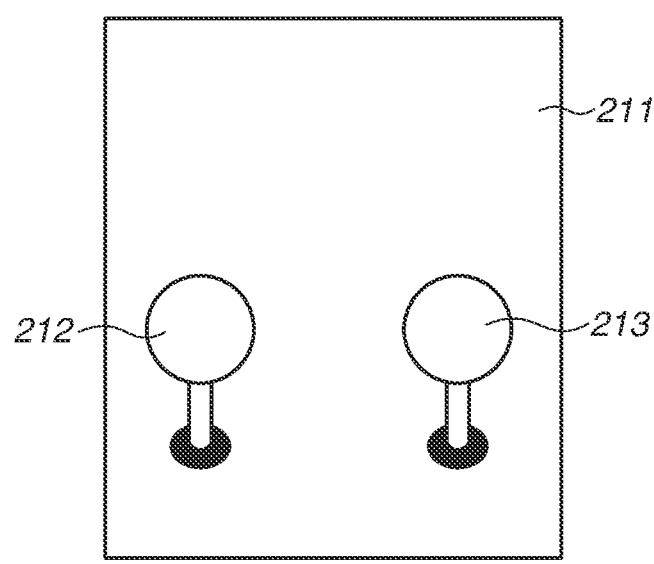

FIG. 2B illustrates a controller 211 operable in six axes, which is an example of the operation unit 115. The controller 211 includes a joysticks 212 and 213 each being operable in three axes. An operation of the position of a virtual viewpoint, an operation of the direction of a virtual viewpoint, and an operation of a viewing angle are allocated to the operational axes of the joysticks 212 and 213. For example, by operating the joystick 212 in three-axis directions, the position of a virtual viewpoint changes in X-axis, Y-axis, and Z-axis directions, and by operating the joystick 213 in three-axis directions, the direction of the virtual viewpoint changes in a pan direction and a tilt direction and a zoom ratio of the virtual viewpoint changes.

[Functional Configuration]

FIG. 2A illustrates an example of a functional configuration of the information processing apparatus 103. An input unit 204 receives an input corresponding to an operation performed by the user via the operation unit 115. The input received by the input unit 204 includes, for example, a parameter indicating change amounts of the position and the direction of a virtual viewpoint. A viewpoint setting unit 201 sets the position and the direction of a virtual viewpoint based on the input received by the input unit 204. A transmission unit 202 transmits viewpoint information indicating the position and the direction of the virtual viewpoint that have been set by the viewpoint setting unit 201, to the image generation apparatus 102 via the communication unit 114.

The image generation apparatus 102 generates a virtual viewpoint image based on the viewpoint information transmitted from the transmission unit 202 and object information indicating a three-dimensional position and a three-dimensional shape of an object located within an image capturing region where the imaging system 101 performs image capturing. Then, an information acquisition unit 205 acquires the virtual viewpoint image generated by the image generation apparatus 102. The information acquisition unit 205 also acquires the object information from the image generation apparatus 102. The object information is generated by the image generation apparatus 102 by, for example, identifying the position and the shape of the object in a three-dimensional space based on a plurality of viewpoint images acquired by the imaging system 101. Information to be acquired by the information acquisition unit 205 from the outside is not limited to these types of information.

A target point identification unit 203 identifies a target point corresponding to the virtual viewpoint based on the viewpoint information indicating the virtual viewpoint set by the viewpoint setting unit 201 and the object information acquired by the information acquisition unit 205. The target point in the present exemplary embodiment is a three-dimensional position of an object to be targeted that is included in a virtual viewpoint image. Specifically, if a virtual viewpoint is designated in such a manner as to generate a virtual viewpoint image in which a specific object, for example a certain player, is set as an object to be targeted, the position of the object is set as a target point. In the present exemplary embodiment, the description will be given assuming that an object to be targeted is a person existing within the image capturing region, but an object to be targeted is not limited to this, and may be a tool such as a ball.

The object to be targeted may be an object located at the center of the virtual viewpoint image or an object closest to the center of the virtual viewpoint image, for example. In addition, for example, in a case where the virtual viewpoint image generated by the image generation apparatus 102 is a moving image of a predetermined reproduction period, an object to be targeted may be an object included in the virtual viewpoint image throughout the entire reproduction period. Nevertheless, the object to be targeted is not limited to these. In addition, in a case where the virtual viewpoint image is a moving image, the object to be targeted may be switched during the reproduction period. In this case, the target point identification unit 203 identifies the position of an object to be targeted that is set before switching, as a target point at a time point before switching, and identifies the position of an object to be targeted that is set after switching, as a target point at a time point after switching.

A storage control unit 206 stores, into a storage unit such as the ROM 113, the position of the target point identified by the target point identification unit 203. In the present exemplary embodiment, a virtual viewpoint image generated by the image generation apparatus 102 is a moving image, and the position of the target point identified by the target point identification unit 203 changes over time. Thus, the storage control unit 206 chronologically stores the positions of the changing target point. A display control unit 207 displays the virtual viewpoint image acquired by the information acquisition unit 205, on the display unit 116. A storage location into which the storage control unit 206 stores information is not limited to a storage unit included in the information processing apparatus 103, and may be a storage unit included in another apparatus connected with the information processing apparatus 103, for example.

The configuration of the image processing system 10 and the configuration of the information processing apparatus 103 are not limited to the above-described examples. For example, some of the components of the information processing apparatus 103 illustrated in FIG. 2A may be mounted on another apparatus that can communicate with the information processing apparatus 103. In addition, the image generation apparatus 102 and the information processing apparatus 103 may be integrally formed, for example.

[Identification Processing of Target Point]

Figure 3A:
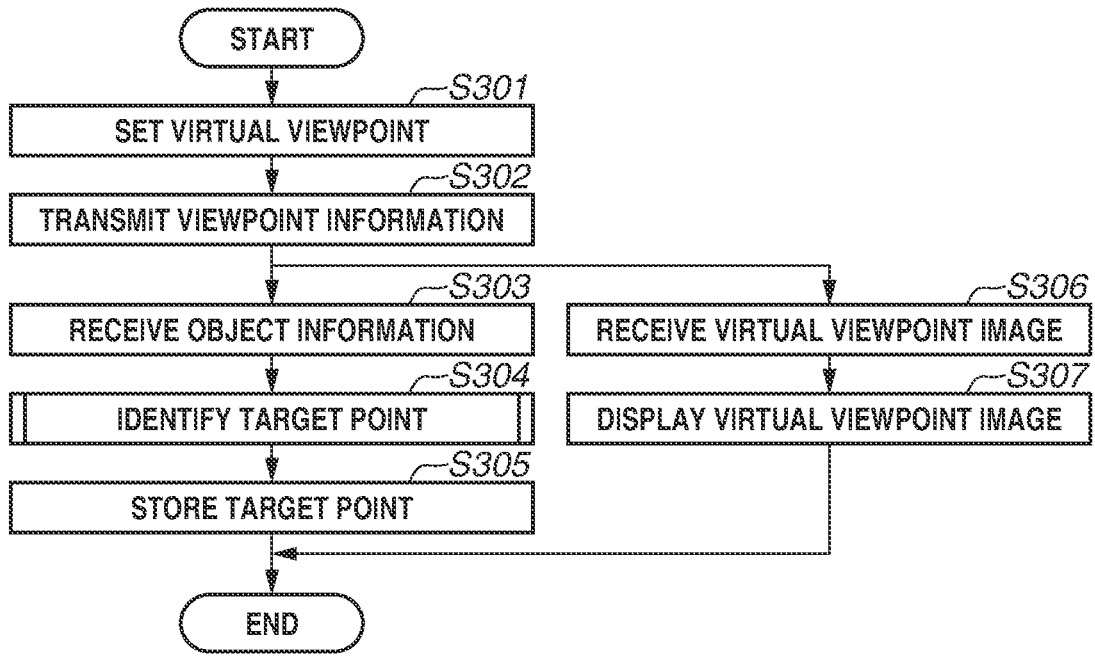
FIGS. 3A and 3B are flowcharts each illustrating an example of an operation of the information processing apparatus relating to identification of a target point.

FIG. 3A is a flowchart illustrating an example of an operation for identifying a target point that is performed by the information processing apparatus 103. The processing illustrated in FIG. 3A is implemented by the CPU 111 of the information processing apparatus 103 loading a program stored in the ROM 113 onto the RAM 112, and executing the program. Alternatively, at least part of the processing illustrated in FIG. 3A may be implemented by a piece of dedicated hardware or a plurality of pieces of dedicated hardware that is different from the CPU 111. The same applies to the processing of flowcharts illustrated in FIGS. 6 and 9, which will be described below. The processing illustrated in FIG. 3A is started at a timing at which the image generation apparatus 102 and the information processing apparatus 103 are connected, and an instruction for designating a virtual viewpoint related to generation of a virtual viewpoint image is input to the information processing apparatus 103. A start timing of the processing illustrated in FIG. 3A is, however, not limited to this. The processing illustrated in FIG. 3A is executed for each of the frames included in a moving image of a virtual viewpoint image.

In step S301, the viewpoint setting unit 201 sets the position and the direction of a virtual viewpoint based on an input corresponding to a user operation received by the input unit 204. In step S302, the transmission unit 202 transmits viewpoint information indicating the position and the direction of the virtual viewpoint that have been set in step S301 to the image generation apparatus 102 via the communication unit 114. More specifically, when the user designates a virtual viewpoint for generating a virtual viewpoint image in which a predetermined object is set as an object to be targeted, the information processing apparatus 103 acquires viewpoint information indicating the position and the direction of the virtual viewpoint, and transmits the viewpoint information to the image generation apparatus 102. In addition, the viewpoint information transmitted in step S302 also includes time information (for example, a frame number of a moving image) indicating a time of a virtual viewpoint image to be generated based on the viewpoint information.

In step S303, the information acquisition unit 205 receives object information indicating the position of the object at the time indicated by the time information included in the viewpoint information transmitted in step S302, from the image generation apparatus 102 via the communication unit 114. In a case where a plurality of objects exists within the image capturing region, object information acquired by the information acquisition unit 205 indicates the positions of the plurality of objects. In step S304, the target point identification unit 203 determines an object to be targeted, from among the plurality of objects existing within the image capturing region, based on the viewpoint information indicating the position and the direction of the virtual viewpoint that have been set in step S301, and the object information acquired in step S303. Then, the target point identification unit 203 identifies the position of the determined object to be targeted, as a target point corresponding to the virtual viewpoint. The details of the processing in step S304 will be described below with reference to FIG. 3B. In step S305, the storage control unit 206 outputs information indicating the target point identified in step S304, to a storage unit.

In step S306, the information acquisition unit 205 receives a virtual viewpoint image generated based on the viewpoint information transmitted in step S302, from the image generation apparatus 102 via the communication unit 114. In step S307, the display control unit 207 displays the virtual viewpoint image acquired in step S306 on the display unit 116. In this manner, a virtual viewpoint image corresponding to a user operation performed on the operation unit 115 is displayed on the display unit 116.

In the present exemplary embodiment, the processing in steps S303 to S305 and the processing in steps S306 and S307 are concurrently performed, but the execution timing of the processing is not limited to this. For example, after either one of the processing in steps S303 to S305 and the processing in steps S306 is ended, the other processing may be performed, or the processing in steps S306 and S307 needs not be performed. In the above-described example, the processing illustrated in FIG. 3A is executed for each of the frames included in the moving image of the virtual viewpoint image, but the execution timing of the processing is not limited to this. For example, the information processing apparatus 103 may collectively acquire pieces of object information indicating the positions of the object in a predetermined period. Then, the information processing apparatus 103 may identify and store the target point in the period based on viewpoint information and object information that correspond to the period. Alternatively, the information processing apparatus 103 may transmit viewpoint information corresponding to the predetermined period to the image generation apparatus 102, and collectively acquire virtual viewpoint images corresponding to the period from the image generation apparatus 102.

Next, the details of the processing in step S304 will be described with reference to FIG. 3B. In the present exemplary embodiment, the target point identification unit 203 identifies an object to be targeted, based on a positional relationship between an optical axis corresponding to the position and the direction of the virtual viewpoint and the position of the object indicated by the object information. In step S311, the target point identification unit 203 identifies an optical axis of a virtual camera based on the viewpoint information. The optical axis of the virtual camera is a straight line extending from the position of the virtual viewpoint (the position of the virtual camera) in an eye direction corresponding to the direction of the virtual viewpoint, and can be represented by the following three-dimensional vector, for example.

$$v = \begin{pmatrix} \sin\alpha\cos\beta \\ \cos\alpha\cos\beta \\ \sin\beta \end{pmatrix}$$

In the three-dimensional vector, a denotes a pan angle of the direction of the virtual viewpoint, and p denotes a tilt angle of the direction of the virtual viewpoint.

Figure 4A:
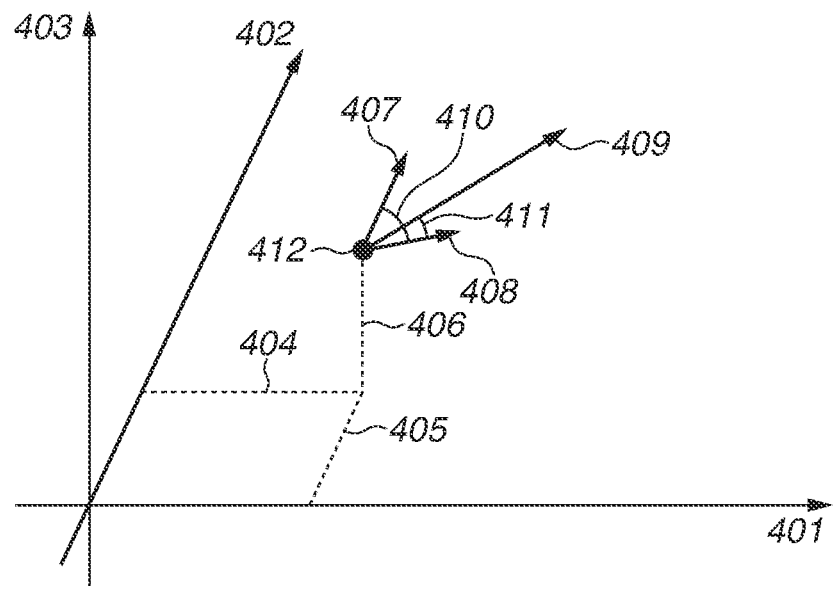
FIGS. 4A and 4B are diagrams illustrating identification of a target point.

FIG. 4A illustrates the optical axis of the virtual camera corresponding to the virtual viewpoint. FIG. 4A illustrates an X-axis 401, a Y-axis 402, and a Z-axis 403, and an X-coordinate 404, a Y-coordinate 405, and a Z-coordinate 406 of a position of a virtual viewpoint 412. A vector 409 corresponds to an eye direction of the virtual viewpoint that has a pan angle 410 and a tilt angle 411. A vector 407 is a vector passing through the position of the virtual viewpoint 412 and being parallel to the Y-axis 402, and a vector 408 is a vector obtained by rotating the vector 407 by a degrees on an XY-plane. In addition, a vector obtained by rotating the vector 408 by p degrees on an XZ-plane is the vector 409, and the vector 409 indicates the optical axis of the virtual camera.

In step S312, the target point identification unit 203 determines whether an object exists on the optical axis of the virtual camera, based on the object information acquired in step S303. When an object exists on the optical axis (YES in step S312), the processing proceeds to step S314. When an object does not exist on the optical axis (NO in step S312), the processing proceeds to step S313. In step S313, the target point identification unit 203 identifies an object having the closest distance from the optical axis of the virtual camera, based on the object information.

Figure 4B:
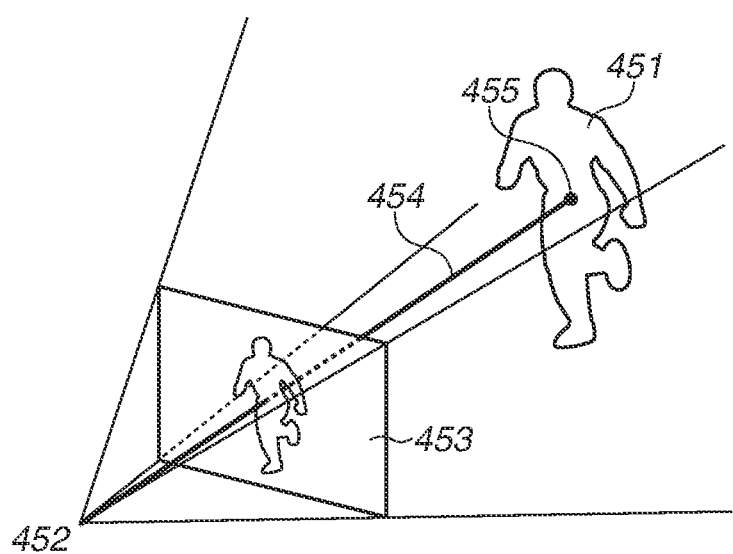

The processing in step S312 will be described with reference to FIG. 4B. A model 451 is a three-dimensional model representing the position and the shape of an object existing within a three-dimensional virtual space associated with an image capturing region, and is represented by object information generated by the image generation apparatus 102 based on a plurality of viewpoint images. An image plane 453 is an imaginary imaging plane on which a virtual viewpoint image generated based on the model 451 arranged in the virtual space and a virtual viewpoint 452 is formed. An optical axis 454 passes through the virtual viewpoint 452 and the center of the image plane 453. The target point identification unit 203 determines whether the model 451 exists on the optical axis 454 (whether an intersection point 455 of the optical axis 454 and the model 451 exists). When the model 451 exists on the optical axis 454 (YES in step S312), the processing proceeds to step S314. When the model 451 does not exist on the optical axis 454 (NO in step S312), the processing proceeds to step S313. When the intersection point 455 exists, a distance between the intersection point 455 and the virtual viewpoint 452 is set as a distance from the virtual viewpoint 452 to an object corresponding to the model 451.

Figure 5A:
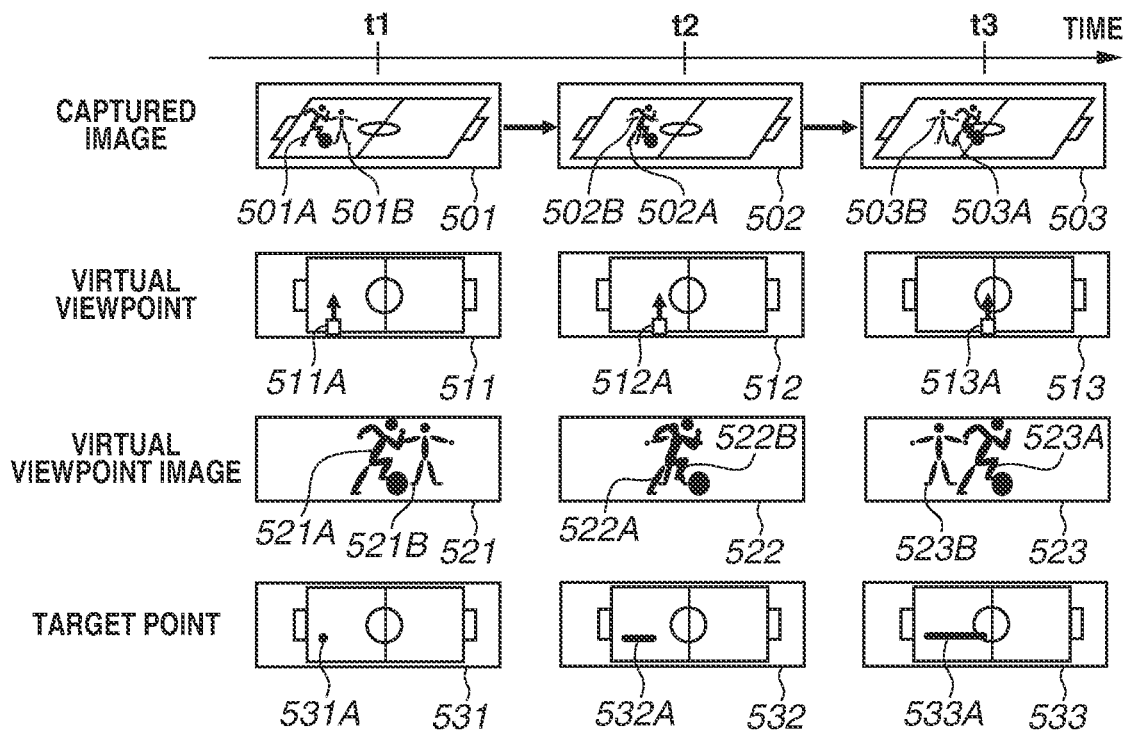
FIGS. 5A to 5E are diagrams illustrating an example of a target point and a virtual viewpoint image.
Figure 5B:
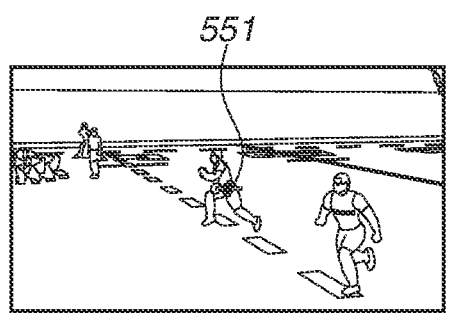
Figure 5C:
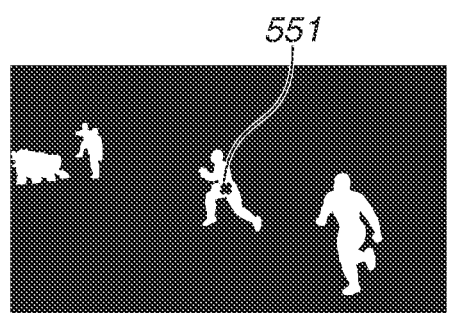

FIG. 5B illustrates an example of a virtual viewpoint image generated by the image generation apparatus 102. The virtual viewpoint image includes RGB values indicating color information for each pixel. FIG. 5C illustrates a state where three-dimensional models of objects existing within a virtual space that are viewed from a virtual viewpoint corresponding to the virtual viewpoint image illustrated in FIG. 5B. In FIG. 5C, regions in which the three-dimensional models exist are displayed in white, and a region in which the three-dimensional models do not exist is displayed in black. Because the optical axis of the virtual camera is a straight line passing through the center of the virtual viewpoint image from the front side toward the rear side, if an object exists at a center 551 of the virtual viewpoint image, a model of an object exists on the optical axis of the virtual camera (YES in step S312), and the processing proceeds to step S314.

Figure 5D:
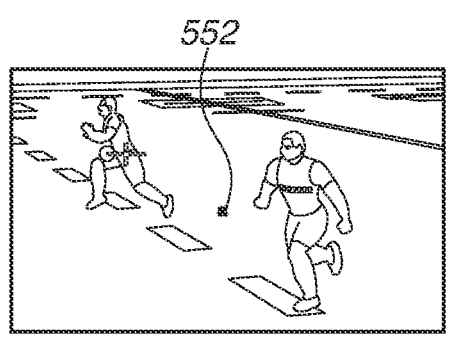
Figure 5E:
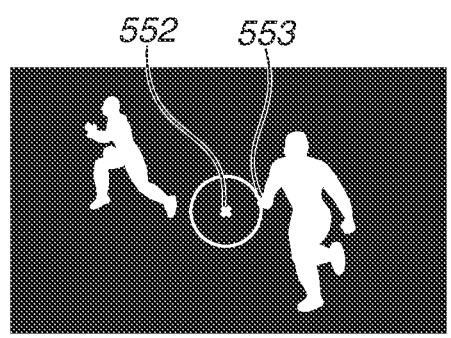

FIG. 5D illustrates an example of a virtual viewpoint image different from the virtual viewpoint image illustrated in FIG. 5B. FIG. 5E illustrates a state where three-dimensional models of objects existing within a virtual space that are viewed from a virtual viewpoint corresponding to the virtual viewpoint image illustrated in FIG. 5D. In the state illustrated in FIG. 5E, because a model of an object does not exist on the optical axis of the virtual camera, in step S313, the target point identification unit 203 identifies an object having the closest distance from the optical axis. For example, an object 553 closest to the center of the image is identified. In addition, when a plurality of objects closest to the optical axis exists, an object having the closest distance from the virtual viewpoint may be identified.

In step S314, the target point identification unit 203 identifies the position of the object identified in step S312 or S313 (the object existing on the optical axis of the virtual camera or the object closest to the optical axis). Then, in step S315, the target point identification unit 203 sets the position of the object that has been identified in step S314, as a target point. For example, the target point identification unit 203 calculates a distance d between the object identified in step S312 or S313 and the virtual viewpoint. Then, the target point identification unit 203 calculates a position f of the target point using the following formula.

$$f = \begin{pmatrix} px \\ py \\ pz \end{pmatrix} + d \times v = \begin{pmatrix} px + d \times \sin\alpha \cos\beta \\ py + d \times \cos\alpha \cos\beta \\ pz + d \times \sin\beta \end{pmatrix}$$

In the formula, px, py, and pz respectively denote the X-coordinate 404, the Y-coordinate 405, and the Z-coordinate 406 at the position of the virtual viewpoint.

In the present exemplary embodiment, a target point to be identified by the target point identification unit 203 is a point closest to the optical axis among a point group forming a model of an object. Nevertheless, the position of the object that is identified as a target point is not limited to this. For example, the centroid position of the object existing on the optical axis or the object close to the optical axis, or the position of a specific portion of an object (face portion of a player, etc.) may be identified as a target point. In a case where a plurality of objects exists on the optical axis of the virtual camera, the target point identification unit 203 may identify the position of an object closest to the position of the virtual viewpoint among these objects, as a target point.

Ina case where no object exists within a fixed distance from the optical axis, the target point identification unit 203 may determine that a target point does not exist in the target frame. In this case, in step S305, the storage control unit 206 needs not store a target point corresponding to the frame. Alternatively, the storage control unit 206 may store a target point identical to a target point identified in the previous frame.

In addition, the target point identification unit 203 may determine whether a difference between a distance from the virtual viewpoint to the position of the object identified in step S312 or S313, and a distance from the virtual viewpoint to the target point in the previous frame is equal to or larger than a threshold. Then, in a case where the difference between the distances is equal to or larger than a threshold, the target point identification unit 203 may identify the position of an object different from the object closest to the optical axis, as a target point. Specifically, the target point identification unit 203 may identify, as a target point in a target frame, the position of an object having a difference between a distance from the virtual viewpoint to the object and a distance from the virtual viewpoint to the target point in the previous frame that is smaller than the threshold. Through such processing, even in a case where an object not to be targeted temporarily comes onto the optical axis of the virtual camera, the position of the object to be targeted can be continuously stored as a target point.

As described above, the information processing apparatus 103 according to the present exemplary embodiment acquires viewpoint information indicating the position and the direction of a virtual viewpoint designated for generating a virtual viewpoint image in which a predetermined object is set as an object to be targeted, and object information indicating the position of the object. Then, the information processing apparatus 103 identifies an object to be targeted that corresponds to the viewpoint information, based on the acquired viewpoint information and object information, and outputs information regarding the identified object. According to the above-described configuration, in a case where a virtual viewpoint related to the generation of a virtual viewpoint image is designated, it is possible to determine an object to be targeted in the virtual viewpoint image generated based on the designated virtual viewpoint, and further identify the position of the object to be targeted. This can enhance convenience in the use of viewpoint information related to the generation of a virtual viewpoint image.

In the present exemplary embodiment, the description will be mainly given of a case where the information processing apparatus 103 identifies a target point based on viewpoint information and object information indicating the position and the shape of an object in a three-dimensional space, but an identification method of a target point is not limited to this. For example, in step S303, the information processing apparatus 103 may acquire a distance image corresponding to the viewpoint information transmitted in step S302. The distance image is an image corresponding to the position and the direction of the virtual viewpoint, and is an image of which each pixel value indicates a distance between an object corresponding to the pixel and the virtual viewpoint. Then, in step S304, the information processing apparatus 103 may identify a target point by performing calculation similar to the above-described calculation, using the distance image as object information indicating the position of the object. According to this method, it is possible to save the amount of data communicated between the information processing apparatus 103 and the image generation apparatus 102. Alternatively, for example, the information processing apparatus 103 may estimate the position of the object and the distance from the virtual viewpoint to the object by analyzing the virtual viewpoint image acquired in step S306, and identify a target point by using the estimation result as object information. In addition, the optical axis of the virtual camera needs not be used for the identification of a target point. For example, the target point identification unit 203 may identify a range included in a field of vision corresponding to the virtual viewpoint, and identify the position of an object included in a range of a predetermined distance from the center of the identified range, as a target point.

FIG. 5A illustrates a specific example of a relationship between a captured image captured by one imaging apparatus included in the imaging system 101, a virtual viewpoint set in step S301, a virtual viewpoint image displayed in step S307, and a target point identified in step S304. Blocks 501, 511, 521, and 531 respectively indicate a captured image, the position and the direction of a virtual viewpoint, a virtual viewpoint image, and a target point at a time t1. When players 501A and 501B included in the captured image are viewed from a virtual viewpoint 511A, the players 501A and 501B appear like player images 521A and 521B included in the virtual viewpoint image. The player image 521A is present at the center of the virtual viewpoint image, and the position of the player 501A is set as a target point 531A. The target point 531A is stored by the storage control unit 206.

Blocks 502, 512, 522, and 532 respectively indicate a captured image, the position and the direction of a virtual viewpoint, a virtual viewpoint image, and a target point at a time t2 later than the time t1. When players 502A and 502B included in the captured image are viewed from a virtual viewpoint 512A, the players 502A and 502B appear like player images 522A and 522B included in the virtual viewpoint image. The player image 522A is present at the center of the virtual viewpoint image, and the position of the player 502A is set as a target point. A trajectory 532A indicates a trajectory of the target point moved during a period from the time t1 to the time t2 (an aggregation of target points at each time). A target point is identified for each frame, and the storage control unit 206 additionally stores a new target point for each frame.

Blocks 503, 513, 523, and 533 respectively indicate a captured image, the position and the direction of a virtual viewpoint, a virtual viewpoint image, and a target point at a time t3 later than the time t2. A trajectory 533A indicates a trajectory of the target point moved during a period from the time t1 to the time 3. The trajectory 533A further includes target points obtained during a period from the time t2 to the time t3, in addition to an aggregate of target points included in the trajectory 532A.

[Setting Processing of Virtual Viewpoint that Uses Target Point]

Next, a usage example of a target point identified by the above-described processing will be described. In the following example, the information processing apparatus 103 displays another virtual viewpoint image different in viewpoint from the virtual viewpoint image displayed in step S307, based on information regarding a target point identified using the method described with reference to FIGS. 3A and 3B, and an input corresponding to a new user operation.

FIG. 6 is a flowchart illustrating an example of an operation of the information processing apparatus 103 for newly setting a virtual viewpoint using information regarding a target point and displaying a virtual viewpoint image. The processing illustrated in FIG. 6 is started at a timing at which an instruction for designating a virtual viewpoint related to generation of a new virtual viewpoint image is input to the information processing apparatus 103 after a target point is identified by the processing as illustrated in FIGS. 3A and 3B. Nevertheless, a start timing of the processing illustrated in FIG. 6 is not limited to this. The processing illustrated in FIG. 6 is executed for each of the frames included in a moving image of a virtual viewpoint image.

In step S601, the input unit 204 receives an input corresponding to a user operation via the operation unit 115. Examples of the input received in step S601 include an input for designating a time of a virtual viewpoint image to be displayed, an input corresponding to an operation for designating the position of a virtual viewpoint, and an input for identifying a target point to be used. In step S602, based on the input received in step S601, the viewpoint setting unit 201 acquires information regarding the target point stored in the storage unit by the processing illustrated in FIG. 3A. In other words, the viewpoint setting unit 201 acquires information for identifying the position of a target object. Specifically, the viewpoint setting unit 201 acquires information regarding a target point corresponding to the time of the virtual viewpoint image that is indicated by the input received by the input unit 204. In a case where a plurality of target points corresponding to the same time is stored, the viewpoint setting unit 201 acquires information regarding a target point corresponding to an input for identifying a target point to be used, such as an input corresponding to a user operation of selecting one target point from among the plurality of target points.

In step S603, the viewpoint setting unit 201 sets the position and the direction of a virtual viewpoint based on the input for designating the position of the virtual viewpoint that has been received in step S601, and information regarding the target point that has been acquired in step S602. The virtual viewpoint set in step S603 is a virtual viewpoint oriented toward the target point from the position determined based on the input corresponding to the user operation. More specifically, when the position of the virtual viewpoint is designated in accordance with a user operation in step S601, the direction of the virtual viewpoint is automatically determined in such a manner that the target point indicated by the information acquired in step S602 is located on the optical axis of the virtual camera.

In step S604, the transmission unit 202 generates viewpoint information indicating the position and the direction of the virtual viewpoint set in step S603, and transmits the viewpoint information to the image generation apparatus 102 via the communication unit 114. In step S605, the information acquisition unit 205 receives a virtual viewpoint image generated based on the viewpoint information transmitted in step S604, from the image generation apparatus 102 via the communication unit 114. In step S606, the display control unit 207 displays the virtual viewpoint image acquired in step S605, on the display unit 116. In this manner, a virtual viewpoint image representing a state of a preliminarily-identified target point that is viewed from a position designated in accordance with a user operation performed on the operation unit 115 is displayed on the display unit 116.

Figure 3B:
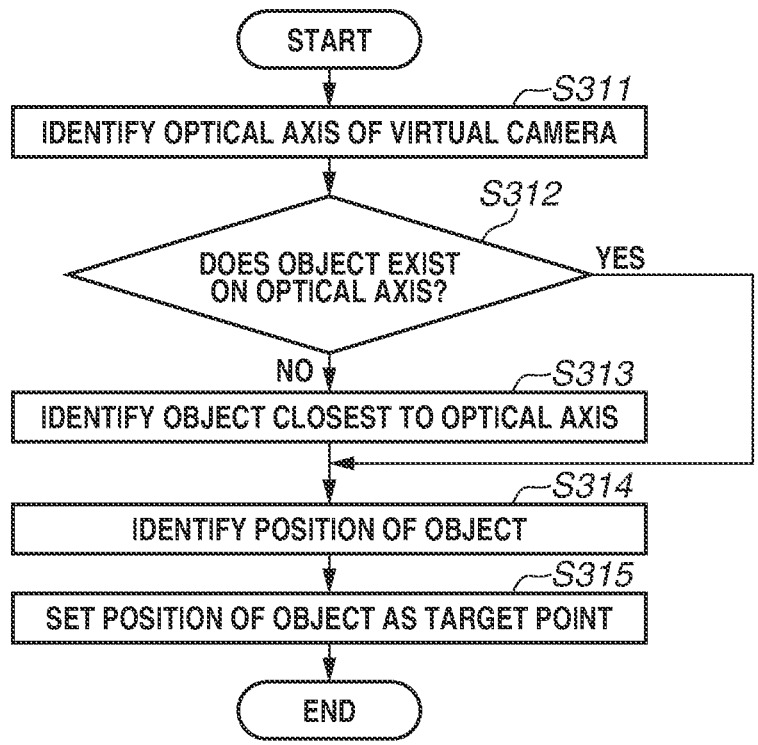

In the present exemplary embodiment, the description has been given assuming that the same information processing apparatus 103 executes the processing illustrated in FIGS. 3A and 3B and the processing illustrated in FIG. 6. In other words, the information processing apparatus 103 can switch whether to use stored information regarding a target point, when setting a virtual viewpoint based on an input corresponding to a user operation. Nevertheless, the configuration of the information processing apparatus 103 is not limited to this. The information processing apparatus 103 may execute only either one of the processing illustrated in FIGS. 3A and 3B and the processing illustrated in FIG. 6. For example, in a case where the image processing system 10 includes a plurality of information processing apparatuses 103, one of the information processing apparatuses 103 may execute the processing illustrated in FIGS. 3A and 3B and store information regarding a target point, and another information processing apparatus 103 may execute the processing illustrated in FIG. 6 using the stored information regarding the target point.

Figure 7:
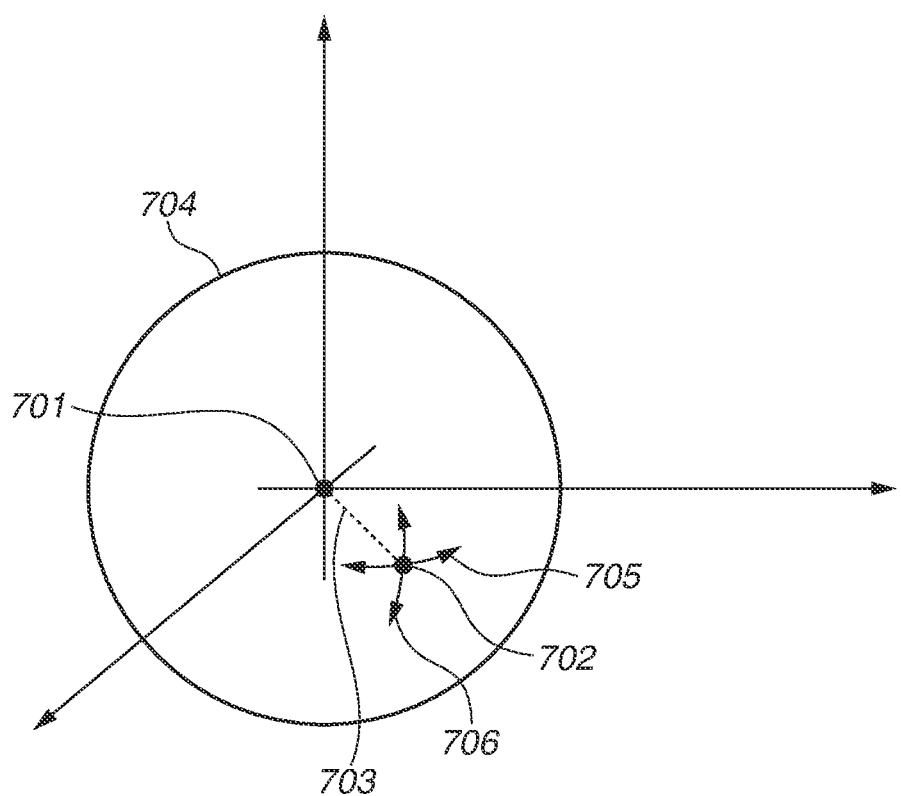
FIG. 7 is a diagram illustrating setting of a virtual viewpoint that uses a target point.

The details for setting a virtual viewpoint in step S603 of FIG. 6 will be described with reference to FIG. 7. As described above, a virtual viewpoint 702 is set to be oriented toward a target point 701. Then, a distance 703 between the virtual viewpoint 702 and the target point 701, and the position of the virtual viewpoint 702 on a spherical surface 704 having a radius corresponding to the distance 703 is changed based on a user operation. A moving direction of the virtual viewpoint 702 on the spherical surface 704 includes two directions corresponding to a longitude direction 705 and a latitude direction 706. In other words, a user operation of a virtual viewpoint is restricted to an operation along any of the three axes including the longitude direction 705, the latitude direction 706, and the radius direction of the spherical surface 704. Thus, the user can set a virtual viewpoint for viewing a target point from an arbitrary direction, by a simpler operation than that in the case of performing operations along five axes including the X-axis, the Y-axis, the Z-axis, a pan axis, and a tilt axis. The number of operational axes of the virtual viewpoint and the content of the operation of the virtual viewpoint are not limited to those in the above-described examples. For example, a virtual viewpoint may move in the X-axis direction, the Y-axis direction, and the Z-axis direction in accordance with a user operation along three axes, and the direction of the virtual viewpoint may be automatically determined by the viewpoint setting unit 201 based on the positions of the target point and the virtual viewpoint.

Figure 8:
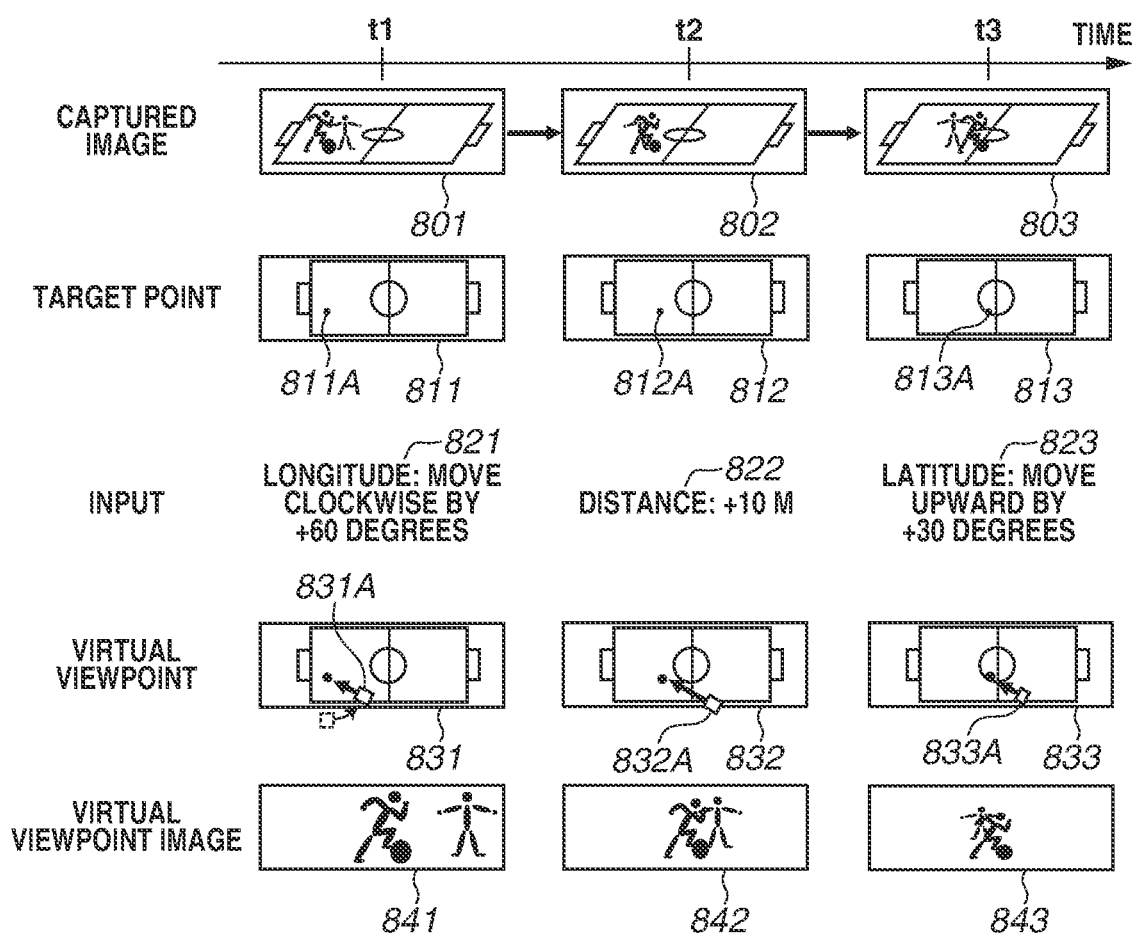
FIG. 8 is a diagram illustrating an example of a target point and a virtual viewpoint.

FIG. 8 illustrates a specific example of a relationship between a captured image captured by an imaging apparatus, a target point acquired in step S602, an input for designating a virtual viewpoint that is received in step S601, a virtual viewpoint set in step S603, and a virtual viewpoint image displayed in step S606. The positions of objects existing within an image capturing region, and captured images in FIG. 8 are similar to those in the example illustrated in FIG. 5A.

Blocks 801, 811, 821, 831, and 841 respectively indicate a captured image, a target point, an input corresponding to a user operation, the position and the direction of a virtual viewpoint, and a virtual viewpoint image at the time t1. The viewpoint setting unit 201 determines the position and the direction of a virtual viewpoint 831A based on a target point 811A and the input corresponding to the user operation. In this example, the position in the longitude direction of the virtual viewpoint moves clockwise by 60 degrees around the target point 811A. The block 841 indicates the virtual viewpoint image corresponding to the moved virtual viewpoint 831A.

Blocks 802, 812, 822, 832, and 842 respectively indicate a captured image, a target point, an input corresponding to a user operation, the position and the direction of a virtual viewpoint, and a virtual viewpoint image at the time 2. In this example, the position of a virtual viewpoint 832A moves away from a target point 812A by 10 m. The block 842 indicates the virtual viewpoint image corresponding to the moved virtual viewpoint 832A.

Blocks 803, 813, 823, 833, and 843 respectively indicate a captured image, a target point, an input corresponding to a user operation, the position and the direction of a virtual viewpoint, and a virtual viewpoint image at the time t3. In this example, the position in a latitude direction of a virtual viewpoint moves upward by 30 degrees around a target point 813A. The block 843 indicates the virtual viewpoint image corresponding to a moved virtual viewpoint 833A.

In addition, the information processing apparatus 103 may simultaneously display, in different regions in the display unit 116, the virtual viewpoint image corresponding to the virtual viewpoint 511A as indicated by the block 521 in FIG. 5A, and the virtual viewpoint image corresponding to the virtual viewpoint 831A as indicated by the block 841 in FIG. 8. The user can thereby easily compare a virtual viewpoint image corresponding to an initially-designated virtual viewpoint and a virtual viewpoint image corresponding to a virtual viewpoint newly designated based on information regarding a target point.

In the above-described example, although a virtual viewpoint is set in such a manner that a target point is located on the optical axis of the virtual camera, a method for setting a virtual viewpoint that is used by the viewpoint setting unit 201 is not limited to this. The viewpoint setting unit 201 only needs to set the position and the direction of a virtual viewpoint in such a manner that a target point is included in a field of vision corresponding to the virtual viewpoint (range included in the virtual viewpoint image), and the target point may be shifted from the optical axis of the virtual camera. For example, the viewpoint setting unit 201 may set a virtual viewpoint in such a manner that a target point is located at a position shifted by a predetermined amount in a predetermined direction from the center of the virtual viewpoint image. The above-described predetermined direction and predetermined amount may be settable in accordance with a user operation via the input unit 204.

[Search Processing of Viewpoint Information that is Performed in Accordance with Object to be Targeted]

Next, another example of a usage method of a target point identified based on viewpoint information will be described. In the following example, the information processing apparatus 103 stores viewpoint information indicating a virtual viewpoint, and identification information of an object to be targeted that corresponds to the virtual viewpoint, in association with each other, and searches for corresponding viewpoint information based on the designation of an object.

Figure 9A:
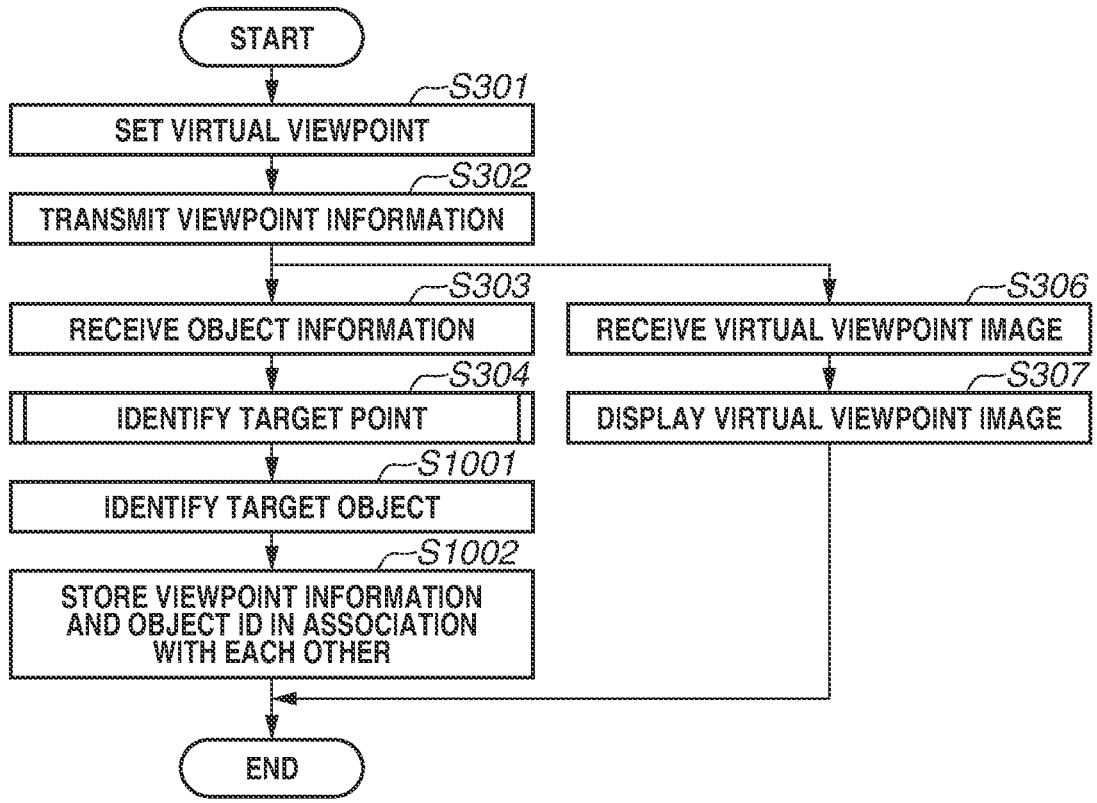
FIGS. 9A and 9B are flowcharts each illustrating an example of an operation of the information processing apparatus relating to searching of viewpoint information that is based on a target point.

FIG. 9A is a flowchart illustrating an example of an operation of the information processing apparatus 103 for storing viewpoint information and identification information of an object to be targeted, in association with each other. The information processing apparatus 103 executes the processing illustrated in FIG. 9A, in place of the processing illustrated in FIG. 3A. The processing illustrated in FIG. 9A differs from the processing illustrated in FIG. 3A in that processes in steps S1001 and S1002 are performed in place of the process in step S305. The difference will be described below.

In step S1001, the target point identification unit 203 identifies an object to be targeted (target object) that corresponds to a target point by determining an object of which the position corresponds to the target point identified in step S304. For example, the target point identification unit 203 acquires pieces of position information of a plurality of objects existing within an image capturing region, and identifies an object at a position closest to the position of the target point identified in step S304, as a target object.

For example, in a case where an image capturing target of the imaging system 101 is a soccer match, the information processing apparatus 103 acquires position information of each player from a position sensor such as a global positioning system (GPS) that is attached to each player. Then, the information processing apparatus 103 identifies a player existing at a position closest to the target point as a target object. A method for acquiring position information of an object, however, is not limited to this. For example, the information processing apparatus 103 may acquire position information of each player that has been obtained by performing image recognition processing on an image captured by the imaging system 101. For another example, the information processing apparatus 103 may acquire position information of each object from the object information acquired in step S303. In this case, the information processing apparatus 103 may directly identify a target object based on viewpoint information and object information without identifying coordinates of a target point in step S304.

In step S1002, the storage control unit 206 outputs, to a storage unit, viewpoint information indicating the position and the direction of the virtual viewpoint that have been set in step S301 and identification information (object ID) of the target object identified in step S1001 in association with each other. The identification information of an object includes a name of a player serving as an object, and a combination of a team name and a uniform number of the player, for example. Nevertheless, identification information is not limited to this.

By performing the processing illustrated in FIG. 9A for each frame of the virtual viewpoint image, the identification information of the target object and the viewpoint information indicating the virtual camera path representing temporal transition of the virtual viewpoint set using the object as an object to be targeted are stored into the storage unit in association with each other. Furthermore, by repeatedly performing the above-described flow by the same information processing apparatus 103 or different information processing apparatuses 103, pieces of viewpoint information indicating a plurality of virtual camera paths, and identification information of a target object corresponding to each virtual camera path are stored into the storage unit.

In the example illustrated in FIG. 9A, the information processing apparatus 103 sequentially stores, into the storage unit, viewpoint information and identification information of a target object while setting a virtual viewpoint corresponding to each frame, but the processing order is not limited to this. For example, the information processing apparatus 103 may generate viewpoint information indicating a virtual camera path, and thereafter store, into the storage unit, identification information of a target object corresponding to the virtual camera path together with the viewpoint information.

Figure 9B:
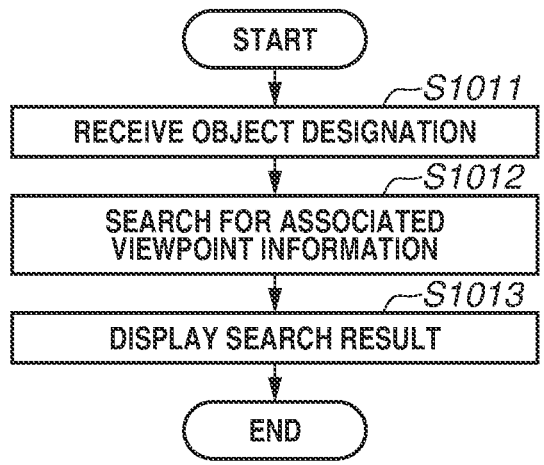

FIG. 9B is a flowchart illustrating an example of an operation of the information processing apparatus 103 for searching for corresponding viewpoint information based on the designation of an object. The processing illustrated in FIG. 9B is started at a timing at which, after the identification information of the object and the viewpoint information are stored into the storage unit in association with each other by the processing illustrated in FIG. 9A, an instruction for searching for viewpoint information is input to the information processing apparatus 103. A start timing of the processing illustrated in FIG. 9B is, however, not limited to this.

In step S1011, the input unit 204 receives an input corresponding to a user operation for designating a specific object. In step S1012, the viewpoint setting unit 201 searches for viewpoint information associated with identification information of the designated object from the viewpoint information stored in the storage unit, based on the input received in step S1011. For example, in a case where an image capturing target of the imaging system 101 is a soccer match, the input unit 204 receives an input corresponding to a user operation of designating a name of a specific player and a team name and a uniform number of the player. Then, the viewpoint setting unit 201 searches for viewpoint information indicating a virtual camera path in which the designated player is set as an object to be targeted.

In step S1013, the viewpoint setting unit 201 outputs, to the display control unit 207, the viewpoint information acquired by the searching from among the viewpoint information stored in the storage unit. In other words, the viewpoint setting unit 201 outputs, to the display control unit 207, the viewpoint information associated with identification information of the object designated in accordance with the user operation. The display control unit 207 displays the search result obtained in step S1012 on the display unit 116 based on the viewpoint information acquired from the viewpoint setting unit 201. For example, the display control unit 207 displays, as a search result, an image representing a virtual camera path indicated by the viewpoint information found by the searching. In addition, for example, the display control unit 207 may transmit the viewpoint information found by the searching to the image generation apparatus 102, receive a virtual viewpoint image generated based on the viewpoint information from the image generation apparatus 102, and display the virtual viewpoint image on the display unit 116.

In the present exemplary embodiment, the description has been given assuming that the same information processing apparatus 103 executes the processing illustrated in FIG. 9A and the processing illustrated in FIG. 9B. Nevertheless, the configuration is not limited to this. The information processing apparatus 103 may execute only either one of the processing illustrated in FIG. 9A and the processing illustrated in FIG. 9B. For example, in a case where the image processing system 10 includes a plurality of information processing apparatuses 103, one of the information processing apparatuses 103 may execute the processing illustrated in FIG. 9A and store the viewpoint information and the identification information of the target object, and another information processing apparatus 103 may execute the search processing illustrated in FIG. 9B.

Figure 10A:
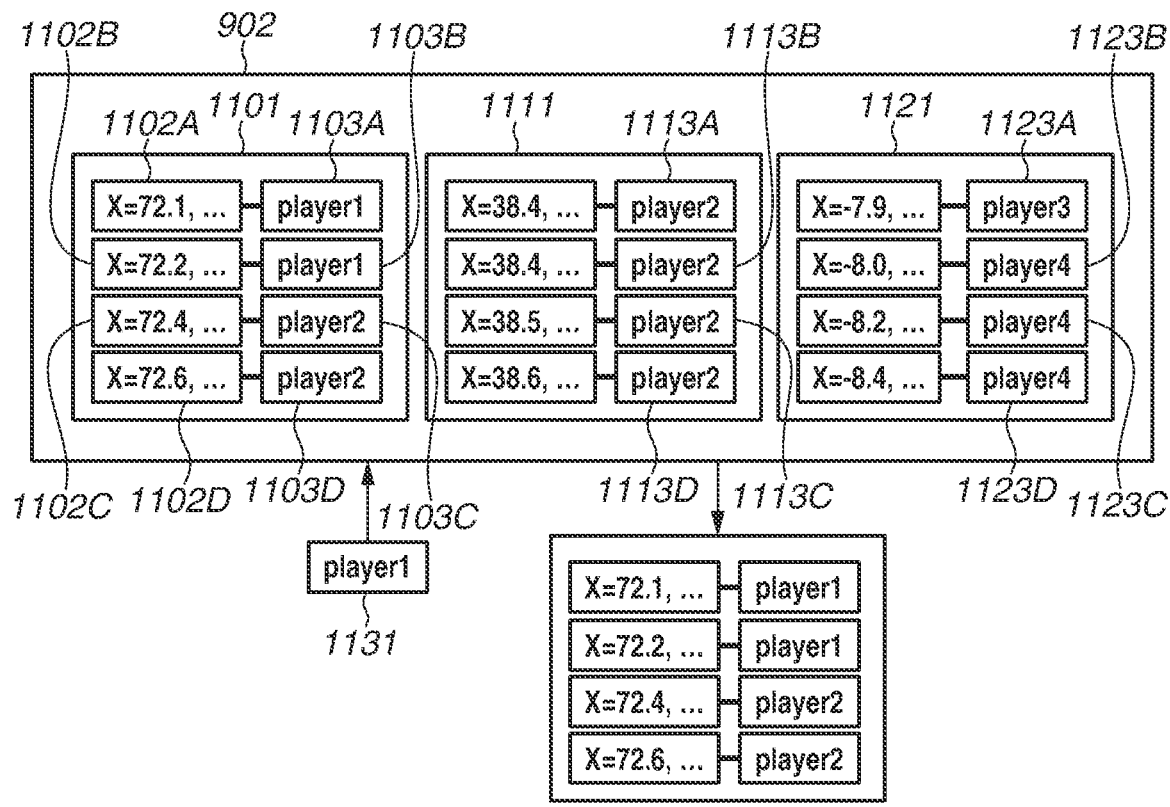
FIGS. 10A and 10B are diagrams illustrating searching of viewpoint information that is based on a target point.

FIG. 10A illustrates a specific example of viewpoint information stored in a storage unit, and viewpoint information found based on the designation of an object. Viewpoint information 1101, viewpoint information 1111, and viewpoint information 1121 indicating respectively different virtual camera paths are stored in a storage unit 902. The viewpoint information 1101 includes a parameter 1102A indicating the position and the direction of a virtual viewpoint at a certain time, and identification information 1103A of a target object corresponding to the virtual viewpoint. The viewpoint information 1101 also includes parameters 1102B, 1102C, and 1102D for the respective subsequent frames, and identification information 1103B, identification information 1103C, and identification information 1103D of target objects respectively corresponding to the parameters 1102B, 1102C, and 1102D. The same applies to the configurations of the viewpoint information 1111 and the viewpoint information 1121.

When information 1131 indicating an object "player1" designated by the user is input via the input unit 204, the information processing apparatus 103 searches, from the viewpoint information stored in the storage unit 902, for viewpoint information associated with identification information of the object "player1". Then, the information processing apparatus 103 outputs the viewpoint information 1101 acquired from the storage unit 902 by the searching.

In the example illustrated in FIG. 10A, when a parameter corresponding to the designated object is included in any viewpoint information, the viewpoint information is output as viewpoint information satisfying a search condition. Nevertheless, the search condition is not limited to this. When all parameters included in the viewpoint information correspond to the designated object, the information processing apparatus 103 may output the viewpoint information as viewpoint information satisfying the search condition. In this case, because the identification information 1103C and the identification information 1103D included in the viewpoint information 1101 indicate an object "player2" different from the designated object, the viewpoint information 1101 is determined not to satisfy the search condition and is not output. In addition, the input unit 204 may receive information indicating which of these two determination methods is to be used, together with information for designating the object.

Figure 10B:
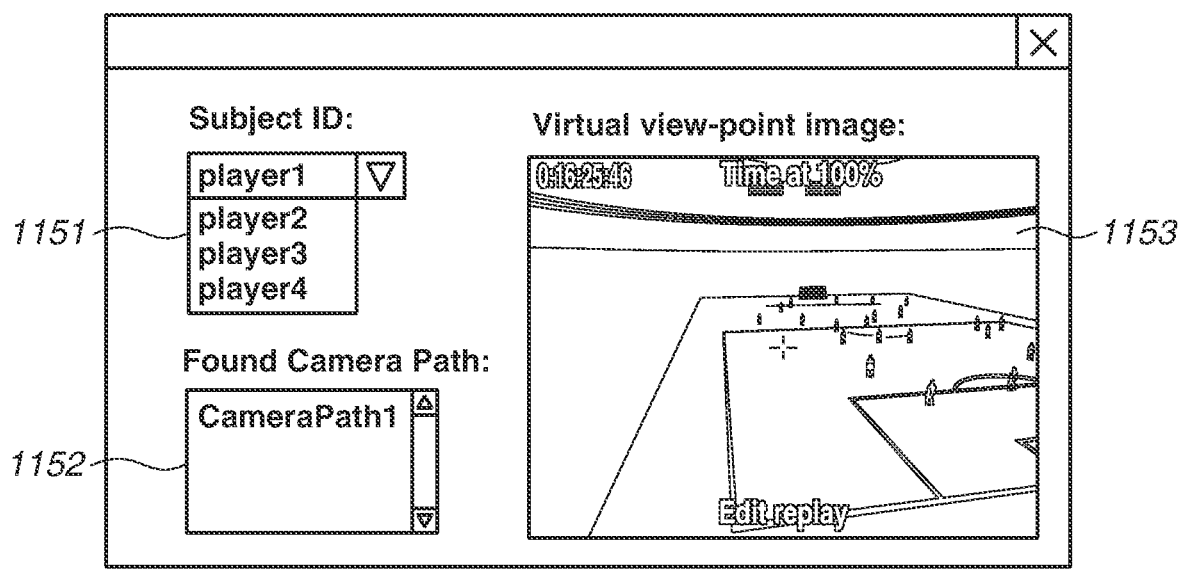

FIG. 10B illustrates an example of an image displayed on the display unit 116 of the information processing apparatus 103. The user designates an object ID to be used as a key in the searching, from among a plurality of displayed object IDs 1151, via the operation unit 115 such as a mouse. When an object ID is designated, an ID of viewpoint information indicating a virtual camera path associated with the object ID is displayed in a search result frame 1152. In a case where a plurality of virtual camera paths corresponding to the designated object ID exists, a plurality of viewpoint information IDs is displayed in the search result frame 1152. When the user selects one of the plurality of viewpoint information IDs displayed in the search result frame 1152 via the operation unit 115, a virtual viewpoint image 1153 corresponding to the selected viewpoint information is displayed. The virtual viewpoint image 1153 is an image generated by the image generation apparatus 102 based on the selected viewpoint information.

When the user designates an object as described above, the information processing apparatus 103 searches for viewpoint information indicating a virtual camera path of the object set as an object to be targeted, and displays a virtual viewpoint image generated based on the viewpoint information. With this configuration, when the user desires to check the movement of a specific player in a match, for example, the user can view a virtual viewpoint image including the player by performing a simple operation.

The above description has been given of the image processing system 10 and an example of processing performed by the image processing system 10, but the present disclosure is not limited to the above-described exemplary embodiment, and various modifications can be made. In addition, part of the above-described exemplary embodiment may be appropriately combined.

According to the above-described exemplary embodiment, information regarding an object to be targeted that corresponds to viewpoint information can be utilized, so that convenience in the use of viewpoint information related to the generation of a virtual viewpoint image can be enhanced.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2019-194811, filed Oct. 25, 2019, which is hereby incorporated by reference herein in its entirety.

What is claimed is:

1. An information processing apparatus comprising:
one or more hardware processors; and
one or more memories storing one or more programs configured to be executed by the one or more hardware processors, the one or more programs including instructions for:
obtaining viewpoint information indicating a position of a virtual viewpoint for generating a virtual viewpoint image and a view direction from the virtual viewpoint;
obtaining object information indicating a position of an object in an image capturing region captured by a plurality of image capturing apparatuses;
identifying an object, based on the viewpoint information and the obtained object information; and
outputting information regarding the object.

2. The information processing apparatus according to claim 1, wherein the identified object is an object located at a center of a virtual viewpoint image generated based on the viewpoint information.

3. The information processing apparatus according to claim 1,
wherein the virtual viewpoint image is a moving image for a predetermined reproduction period, and
wherein, in a case where an object in the virtual viewpoint image switches in the reproduction period, an object that is set before the switching and an object that is set after the switching are identified.

4. The information processing apparatus according to claim 1,
wherein the virtual viewpoint image is a moving image for a predetermined reproduction period, and
wherein the identified object is an object included in the virtual viewpoint image throughout the entire reproduction period.

5. The information processing apparatus according to claim 1, wherein the object is identified based on a positional relationship between a straight line extending from the position of the virtual viewpoint that is indicated by the viewpoint information in a direction corresponding to the view direction from the virtual viewpoint, and the position of the object that is indicated by the object information.

6. The information processing apparatus according to claim 1,
wherein the virtual viewpoint image is generated based on a plurality of images obtained by the plurality of imaging apparatuses,
wherein the obtained viewpoint information indicates a position of a virtual viewpoint in a three-dimensional space associated with the image capturing region, and
wherein the obtained object information indicates a position of an object in the three-dimensional space.

7. The information processing apparatus according to claim 1, wherein the object is a person in the image capturing region.

8. The information processing apparatus according to claim 1, wherein the obtained viewpoint information further indicates a viewing angle corresponding to the virtual viewpoint.

9. The information processing apparatus according to claim 1, wherein identification information of the object identified by the identification unit and the viewpoint information in association with each other is output to a storage device.

10. The information processing apparatus according to claim 9, the one or more programs further include the instructions for:
receiving an input corresponding to an operation for designating an object; and
obtaining, from the storage device, viewpoint information associated with identification information of the object designated by the operation, from among the viewpoint information stored in the storage device, in accordance with the received input.

11. The information processing apparatus according to claim 9, wherein the identification information of the identified object is a name of a player or combination of a team to which the player belongs and a uniform number of the player.

12. The information processing apparatus according to claim 1, wherein the output information indicates a position of the identified object.

13. The information processing apparatus according to claim 12, wherein the one or more programs further include the instructions for:
receiving an input corresponding to an operation for designating a virtual viewpoint; and
generating viewpoint information indicating a position and a direction of a virtual viewpoint and a view direction from the virtual viewpoint oriented toward the position of the object that is indicated by the output information, from a position determined based on the received input.

14. The information processing apparatus according to claim 13, wherein the one or more programs further include the instructions for displaying, on a display device, a virtual viewpoint image generated based on the viewpoint information.

15. The information processing apparatus according to claim 1,
wherein the virtual viewpoint image is a moving image having a plurality of frames, and
wherein the output information includes information for identifying a specific frame included in the plurality of frames and information for identifying a position which, in the identified object, corresponds to the specific frame.

16. An information processing method comprising:
obtaining viewpoint information indicating a position of a virtual viewpoint for generating a virtual viewpoint image and a view direction from the virtual viewpoint;
obtaining object information indicating a position of an object in an image capturing region captured by a plurality of image capturing apparatuses;
identifying an object, based on the obtained viewpoint information and the obtained object information; and
outputting information regarding the identified object.

17. A non-transitory computer-readable storage medium storing a program for causing a computer to execute an information processing method, the information processing method comprising:
    obtaining viewpoint information indicating a position of a virtual viewpoint for generating a virtual viewpoint image and a view direction from the virtual viewpoint;
    obtaining object information indicating a position of an object in an image capturing region captured by the plurality of image capturing apparatuses;
    identifying an object, based on the obtained viewpoint information and the obtained object information; and
    outputting information regarding the identified object.

18. An information processing apparatus comprising:
    one or more hardware processors; and
    one or more memories storing one or more programs configured to be executed by the one or more hardware processors, the one or more programs including instructions for:
    obtaining a virtual viewpoint image generated based on images captured by a plurality of image capturing apparatuses;
    obtaining object information indicating a position of an object in an image capturing region captured by the plurality of image capturing apparatuses;
    identifying an object, based on the obtained virtual viewpoint image and the obtained object information; and
    outputting information regarding the identified object.

19. The information processing apparatus according to claim 18, wherein the identified object is located at center of the virtual viewpoint image.

20. An information processing method comprising:
    obtaining a virtual viewpoint image generated based on images captured by a plurality of image capturing apparatuses;
    obtaining object information indicating a position of an object in an image capturing region captured by the plurality of image capturing apparatuses;
    identifying an object, based on the obtained virtual viewpoint image and the obtained object information; and
    outputting information regarding the identified object.

21. A non-transitory computer-readable storage medium storing a program for causing a computer to execute an information processing method; the method comprising:
    obtaining a virtual viewpoint image generated based on images captured by a plurality of image capturing apparatuses;
    obtaining object information indicating a position of an object in an image capturing region captured by the plurality of image capturing apparatuses;
    identifying an object, based on the obtained virtual viewpoint image and the obtained object information; and
    outputting information regarding the identified object.

\* \* \* \* \*